B. F. ROE.
Fanning Mill.
No. 29,998.            Patented Sept. 11, 1860.
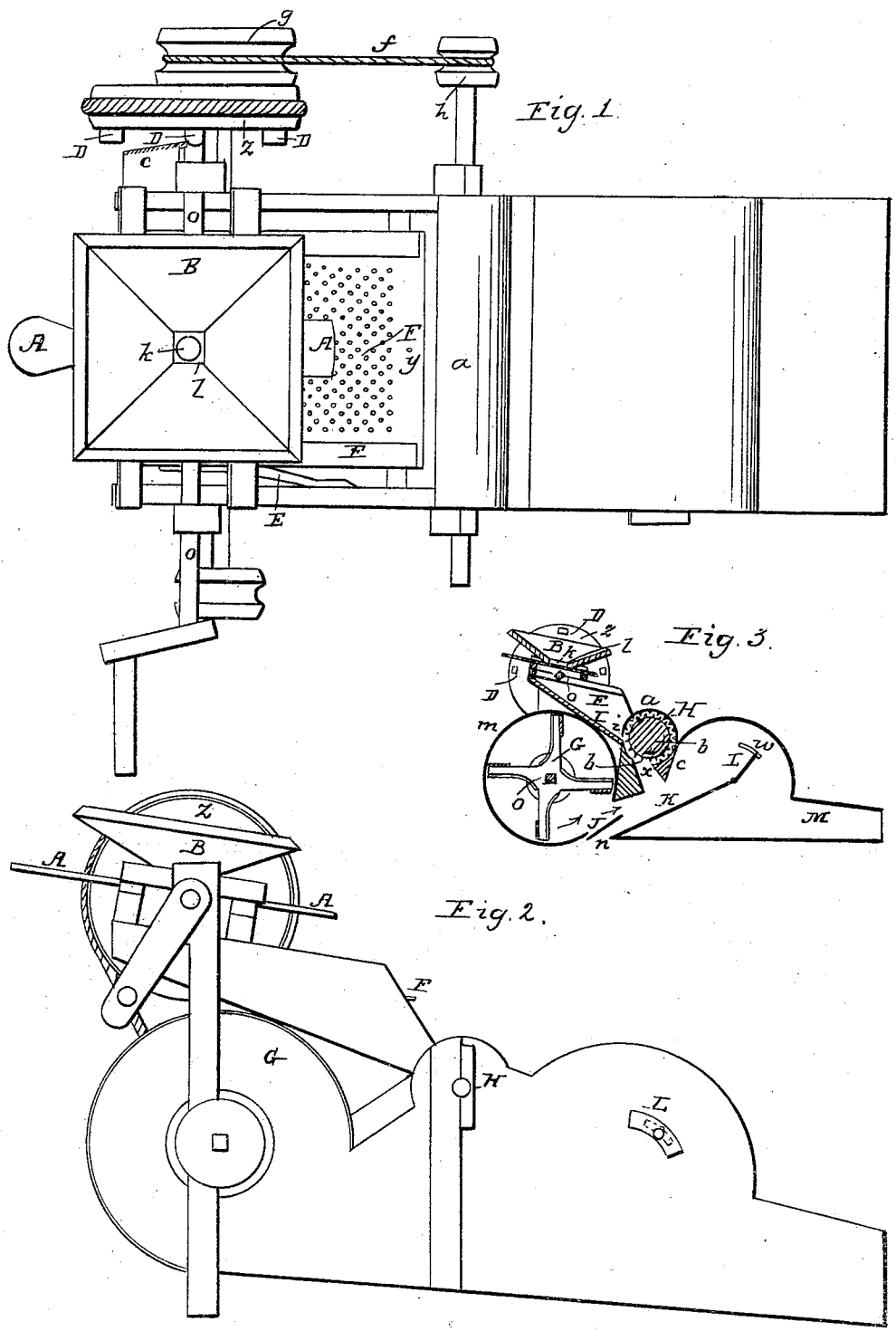

UNITED STATES PATENT OFFICE.

BERNARD F. ROE, OF NEBRASKA CITY, NEBRASKA.

FANNING-MILL.

Specification of Letters Patent No. 29,998, dated September 11, 1860.

*To all whom it may concern:*

Be it known that I, B. F. ROE, of Nebraska City, in the county of Otoe, Nebraska, have invented a new and useful Improvement in Grain-Cleaners; and I do hereby declare that the following is a full, clear, and exact description of the same, reference being had to the accompanying drawings, forming a part of this specification, in which—

Figure 1, is a top view, Fig. 2, a side view, and Fig. 3, a vertical longitudinal section of the machine, Fig. 3, being drawn on a smaller scale than the other figures.

Similar letters of reference, in each of the several figures indicate corresponding parts.

The nature of my invention consists in the combination and arrangement of a toothed scouring cylinder, a toothed concave and a smooth concave, apertures being between the two concaves, for the purposes hereafter to be described.

To enable others skilled in the art, to make and use my invention, I will proceed to describe its construction and operation.

The grain is put into a hopper B, and drops through the hole $l$, in the bottom of the hopper, and through the hole $k$, in the adjustable slide A, onto the sieve F. This sieve is hung upon a pivot $y$, and is provided with a spring E, at one side and a projection C, at the other. This projection is acted upon at intervals by cogs D, arranged on the side surface of the pulley $z$, upon driving shaft $o$. The cogs D, in combination with the reaction of the spring E, impart a vibrating motion to the sieve.

Stones and similar coarse impurities will pass over the sieve, the holes of which are just large enough to let through the grain which falls onto the incline I, and is thus fed to the scouring device, which consists of a toothed scouring cylinder H, a toothed concave $a$, $c$, which partially surrounds the scouring cylinder, and a smooth concave $b$, placed at the end of the incline I, and between both ends of the concave $a$, $c$, so as to leave an aperture $i$, at the end of the incline for the admission of the grain to the scouring device, and an aperture $x$, between the two concave $b$, $c$, for the grain to drop out.

If the grain is not excessively dirty with smut, the belt $f$, is placed around pulley $h$, so as to revolve the scouring cylinder in the direction of arrow 2. The grain entering the scouring device through aperture $i$, will be taken up by the teeth of the cylinder and carried around so as to finally drop out at $x$. The grain will be thoroughly scoured while passing between the toothed surface of the cylinder, and the toothed concave $a$, $c$.

If the grain is mixed with a great deal of smutty matter, which would be liable to choke up the toothed surface of the concave $a$, $c$, and thus prevent the proper action of the machine and also dirty or smut the grain, the band $f$, is crossed so as to reverse the motion of cylinder H, as indicated by arrow 1. The grain will now pass between the cylinder and the smooth concave $b$, and be partially scoured during its passage between the two surfaces. This scouring operation has to be repeated by throwing the grain again into hopper B, and running it again through between the cylinder H, and concave $b$, until perfectly clean. As the concave $b$, is not provided with teeth, it is not liable to be clogged with the foreign substances being separated from the grain, nor are the smut balls liable to be broken.

The grain, chaff, dirt, &c. passing through the aperture $x$, toward incline $k$, is exposed to the separating action of a blast of wind created by the ventilator G. The incline K, has a wing L, jointed to its end. This wing can be set at a greater or less inclination by means of a clamp screw working through a curved slot $w$, in the side of the machine.

If the grain is very light, the wing L, is raised so as to break the force of the wind and prevent the grain from being blown too far. If the grain is heavy, the wing L, is lowered so as to allow the full force of the wind to act upon the grain.

What I claim as my invention and desire to secure by Letters Patent, is—

The combination and arrangement of a toothed scouring cylinder H, a toothed concave $a$, $c$, and a smooth concave $b$, with apertures $i$, and $x$, between the two concaves, substantially as and for the purposes set forth.

The above specification of my improvement in fanning mills signed by me this 12th day of April 1860.

B. F. ROE.

Witnesses:
GOODWIN Y. AT LEE,
R. W. FENWICK.